(12) United States Patent
Toub et al.

(10) Patent No.: US 11,593,078 B2
(45) Date of Patent: *Feb. 28, 2023

(54) RELOAD ORDERING FOR EXECUTABLE CODE MODULES

(71) Applicant: Microsoft Technology Licensing, LLC, Redmond, WA (US)

(72) Inventors: Stephen Harris Toub, Winchester, MA (US); Stephane Delcroix, Brussels (BE); Jan Kotas, Redmond, WA (US); Michael John McLaughlin, Redmond, WA (US); Pranav Krishnamoorthy, Newcastle, WA (US); Thomas A. McDonald, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,511

(22) Filed: Jul. 19, 2022

(65) Prior Publication Data

US 2022/0413815 A1 Dec. 29, 2022

Related U.S. Application Data

(63) Continuation of application No. 17/359,276, filed on Jun. 25, 2021, now Pat. No. 11,409,508.

(51) Int. Cl.
G06F 9/44 (2018.01)
G06F 8/41 (2018.01)
G06F 11/36 (2006.01)

(52) U.S. Cl.
CPC ............ *G06F 8/44* (2013.01); *G06F 11/3624* (2013.01)

(58) Field of Classification Search
None
See application file for complete search history.

(56) References Cited

U.S. PATENT DOCUMENTS

| 9,134,975 | B1 * | 9/2015 | Beavin | G06F 8/443 |
| 10,248,409 | B1 * | 4/2019 | Pohlack | G06F 8/658 |
| 10,541,042 | B2 * | 1/2020 | Nelson | G06F 11/3664 |
| 10,545,855 | B1 * | 1/2020 | Jayaswal | G06F 11/3608 |
| 2004/0003380 | A1 * | 1/2004 | Fedorov | G06F 9/44589 |
| | | | | 717/148 |

* cited by examiner

*Primary Examiner* — Qamrun Nahar
(74) *Attorney, Agent, or Firm* — Alleman Hall Creasman & Tuttle LLP

(57) ABSTRACT

A computing device including a processor configured to receive source code including a plurality of source code modules. The processor may generate executable code from the source code and assign two or more reload indicators to two or more executable code modules. The processor may execute the executable code. During execution of the executable code, the processor may receive a source code update and generate an executable code update from the source code and the source code update. The processor may apply the executable code update to the executable code to generate updated executable code. The processor may generate a reload ordering of two or more reload operations corresponding to the reload indicators. As specified by the reload ordering, the processor may perform the two or more reload operations at the two or more respective executable code modules. The processor may execute the updated executable code.

20 Claims, 10 Drawing Sheets

RELOAD ORDERING FOR EXECUTABLE CODE MODULES

CROSS REFERENCE TO RELATED APPLICATIONS

This application is a continuation of U.S. patent application Ser. No. 17/359,276, filed Jun. 25, 2021, the entirety of which is hereby incorporated herein by reference for all purposes.

BACKGROUND

A hot reload is a process in which a patch to a program is installed while the program is running. Thus, while the program has an active thread being executed by a processing unit of a computer, a portion of the source code being executed is updated by a patch of source code that replaces the portion to be updated, without termination of the process by the processing unit. Hot reloads may be used by developers of application programs during development of a program. It will be appreciated that during development of a program, developers iteratively write source code for a program, compile the source code, and run the source code to test whether it performed as intended. In a process referred to as debugging, developers fix errors discovered when running the program by updating, compiling, and executing the source code repeatedly, until no more errors are observed when executing the compiled program.

Developing complicated programs in this manner can be challenging and time consuming. For example, in a complex program, significant time may be spent compiling and executing the source code to the point where an error is discovered. In a traditional debugging process, the execution of the thread is terminated when the error is discovered, and the context or state of the program at that point is lost. The context of the program may take various forms. For example, the context may include data read from working memory, mass storage, or an external database by the program during execution, intermediate processing results of the program during execution, a state of a user interface that is displayed by the program during execution, or parameters passed to the program via a command entered in a command line execution environment. Preserving the context of the application program using a hot reload may allow the developer to avoid having to recreate the context in which the application program is executed every time the developer makes a modification to the application program. However, various technical challenges exist to executing a hot reload that preserves the context of the executing program in this manner.

In some development scenarios, a debugger program is used that is executed contemporaneously with the program-under-development, and an inter-process communication (socket, pipe, shared memory, etc.) is used to communicate between the debugging program process and the program-under-test process. Some debugger programs include an edit and continue function that enables a developer to pause execution of a program being debugged, make certain types of code edits, and continue execution of the edited code in the debugger context. However, not all languages are supported and not all types of code edits are compatible with such edit and continue features in modern debugger programs. Thus, hot reload is not available for all types of code edits even in such debugger environments.

Further, in some debuggers, code changes that affect the state of an application program, or dependencies or class definitions within the application program, may not function properly with hot reload. Such improper functioning may occur when the data available to the updated program following hot reload is not fully consistent with the data that would be available to the program if the program were terminated, recompiled, and re-executed. Inconsistencies in the data may occur due to the changes in the program state, dependencies, or class definitions, for example. Thus, hot reload might produce results that are different from results that would be obtained if the program were terminated, recompiled, and re-executed. It will also be noted that use of a debugger program is not desirable in all development scenarios. In situations in which a debugger program is not used, hot reload functionality discussed above is not generally available to developers. In view of the above, technical challenges remain to broader adoption of hot reload functionality for developers.

SUMMARY

According to one aspect of the present disclosure, a computing device is provided, including a processor configured to receive source code including a plurality of source code modules. At a compiler or interpreter, the processor may be further configured to generate executable code from the source code. The executable code may include a plurality of executable code modules corresponding to the plurality of source code modules. The processor may be further configured to assign two or more reload indicators to two or more executable code modules of the plurality of executable code modules. The processor may be further configured to execute the executable code. During execution of the executable code, the processor may be further configured to receive a source code update to the source code. At the compiler or interpreter, the processor may be further configured to generate an executable code update from the source code and the source code update. The processor may be further configured to apply the executable code update to the executable code to generate updated executable code. The processor may be further configured to generate a reload ordering of two or more reload operations corresponding to the reload indicators. As specified by the reload ordering, the processor may be further configured to perform the two or more reload operations at the two or more respective executable code modules to which the reload indicators are assigned. The processor may be further configured to execute the updated executable code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various technical challenges exist to providing hot reload functionality with broad application to software development. As mentioned above, previous implementations of hot reloading in debugger environments may not be usable when the developer makes changes to class definitions or changes in dependencies between code modules included in a program. Previous implementations of hot reloading may also inaccurately reflect the behavior of the program during ordinary use, since reloading contextual data may produce a context that differs from contexts in which the program would be executed outside a debugger environment. Thus, hot reload functionality may be only intermittently available to the developer and may lead the program to function improperly when used.

Current methods of hot reloading may also have insufficient support for processes that are configured to be executed after a hot reload patch is applied. For example, in response to applying a hot reload patch to source code, a developer may wish to reload a portion of the context in which the application-under-test is executed while maintaining other portions of the context. When existing methods of hot reloading are used, the behavior of the application under test may differ depending on the order in which the modules of the application are reloaded. These differences in behavior may occur due to dependencies among the modules. Accordingly, existing methods of hot reloading may lead to inconsistent application behavior that may further hinder development of the application.

It will also be appreciated that although some support for hot reloading has been implemented in certain debugger programs, not all development activities are performed using such debugger programs. Thus, technical challenges exist in utilizing hot reloading outside the context of a debugging thread.

Figure 1A:
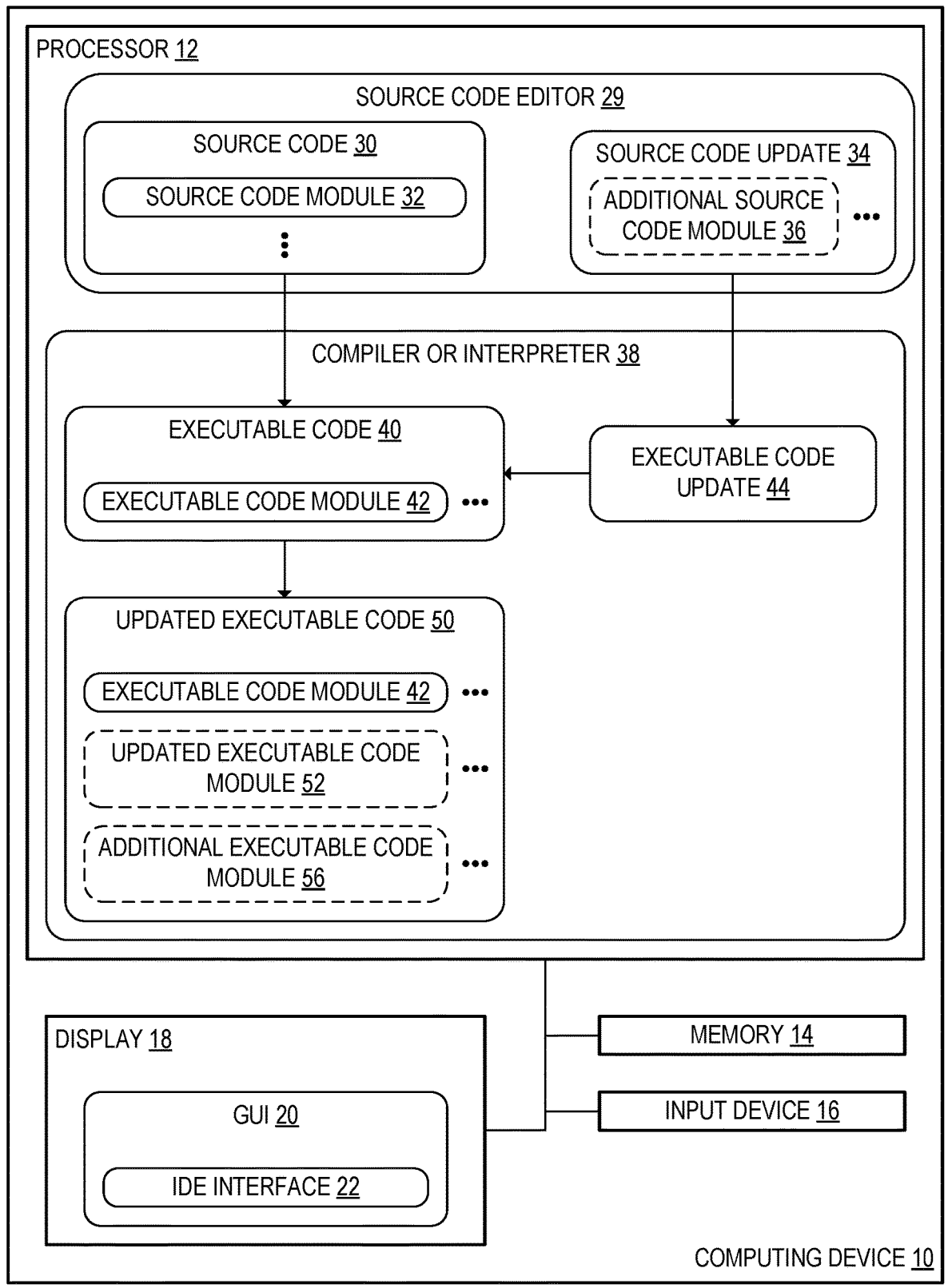
FIG. 1A schematically shows an example computing device including a processor configured to receive source code and execute a compiler, according to one embodiment of the present disclosure.

In order to address the above challenges, a computing device 10 is provided, as shown in the example of FIG. 1A. FIG. 1A shows the example computing device 10 when a source code 30 of an application program is updated. As shown in the example of FIG. 1A, the computing device 10 may include a processor 12 that is configured to perform data processing operations. In addition, the computing device 10 may further include memory 14 that is communicatively coupled to the processor 12 and is configured to store data. The memory 14 may include volatile and/or non-volatile forms of memory.

In the example of FIG. 1A, the processor 12 and memory 14 are shown within a single physical computing device. However, in other examples, the functionality of the processor 12 and/or the memory 14 may be distributed across a plurality of communicatively coupled physical computing devices. The plurality of physical computing devices may, in such examples, include one or more server computing devices located in a data center. The plurality of communicatively coupled physical computing devices may additionally or alternatively include one or more client computing devices. In the example of FIG. 1A, the computing device 10 is instantiated at least in part at a client computing device that includes one or more input devices 16 via which a user may enter user input. The computing device 10 may further include a display 18 at which a graphical user interface (GUI) 20 may be displayed. The GUI 20 may, for example, display an integrated development environment (IDE) interface 22 including interactable graphical elements associated with an IDE. Via the IDE interface 22, the user may write and modify the source code 30. It will be appreciated that an IDE typically includes a source code editor 29, a compiler or interpreter 38, and a debugger (such as debugger 100 illustrated in FIG. 4) configured to work integrally with each other, and may also include other components such as a version control system, visual programming tools, class guides, etc.

The processor 12 may be configured to receive source code 30 including a plurality of source code modules 32. The source code may be received from a stored location in a file system or from a source code editor 29, as some specific examples. The plurality of source code modules 32 may each include one or more code instructions. Each source code module 32 may, for example, be written as a function or code object. The source code 30 may encode dependencies between the plurality of source code modules 32 such that the plurality of source code modules 32 are hierarchically organized into a graph, directed graph, or tree structure, for example. The graph, directed graph, or tree structure may be flattened into an ordered list by performing a topological sort function on the graph, directed graph, or tree structure, to thereby arrive at the ordering. A dependency between source code modules exists where one source code module requires another source code module in order to properly function, such as when one source code module calls another source code module as a function or type, or when one source code module reads from shared memory, from a file, or from a database, for example, data that is supposed to be written by another source code module, or where a global variable whose value is set by one source code module is read and processed by another source code module, as some specific examples.

The processor 12 may be further configured to execute a compiler or interpreter 38. At the compiler or interpreter 38, the processor 12 may be configured to generate executable code 40 from the source code 30. The executable code 40 may take the form of a plurality of assembly code instructions. In some examples, the source code 30 may be compiled directly into assembly code. Alternatively, the source code 30 may be compiled into intermediate-language instructions that may subsequently be compiled into assembly-language instructions. In examples in which the source code 30 is interpreted at the source code level, the interpreter may replace the source code 30 with the executable code 40 when the executable code is generated. The source code 30 may be compiled or interpreted in a just-in-time (JIT) or ahead-of-time (AOT) manner.

The executable code 40 may include a plurality of executable code modules 42 corresponding to the plurality of source code modules 32. These executable code modules may be compiled object code. Examples of programming languages that utilize a compiler to generate compiled object code include C, C++, C#, etc. Examples of programming languages that utilize an interpreter include JavaScript, Perl, Python, BASIC, etc. In some examples, the compiler or interpreter 38 may be configured to generate the executable code 40 such that instead of having a one-to-one correspondence with the plurality of source code modules 32, the plurality of executable code modules 42 have divide and/or combine the functionality specified by one or more source code modules 32.

Figure 1B:
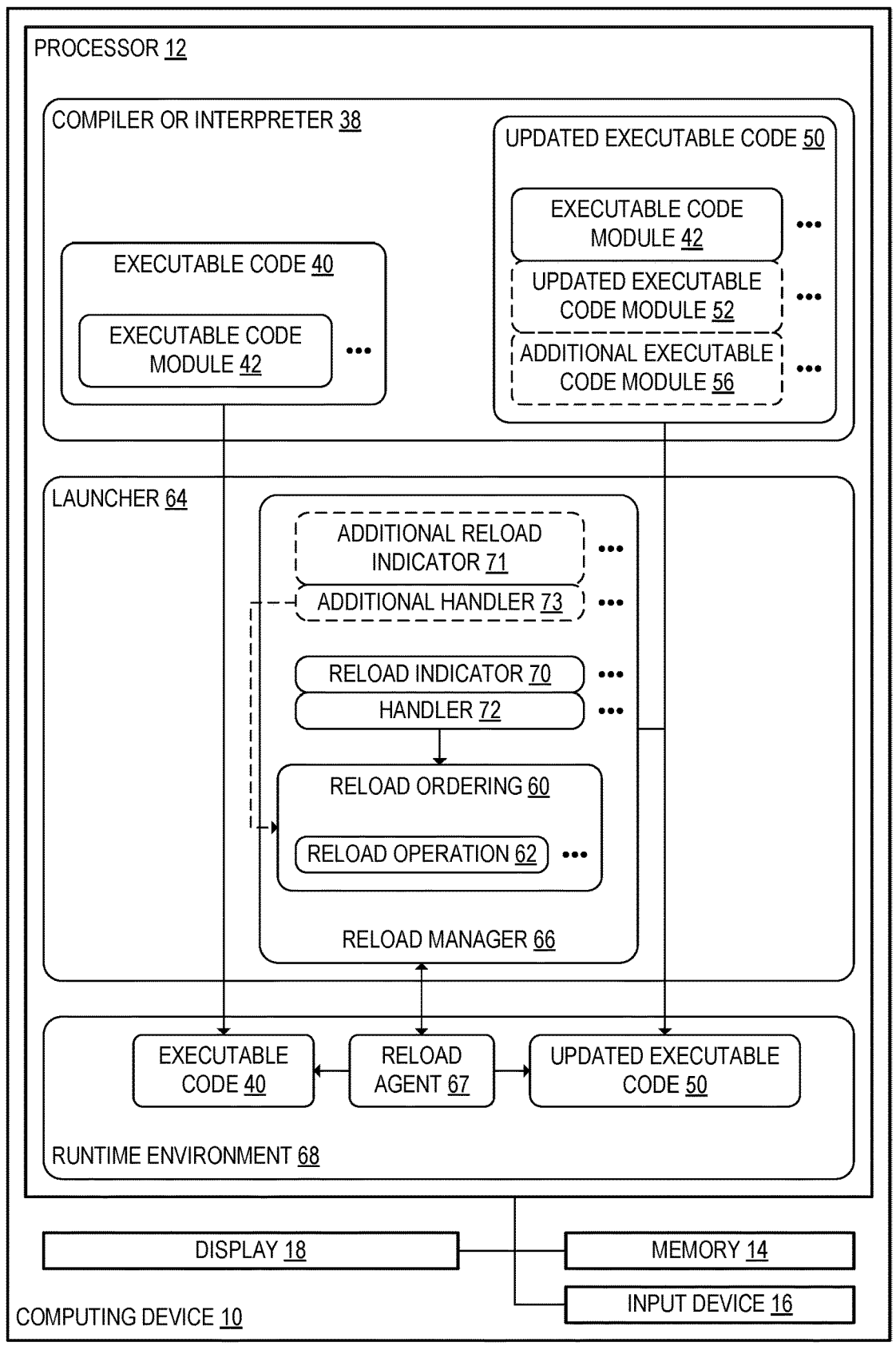
FIG. 1B schematically shows the example computing device of FIG. 1A when the processor generates a reload ordering of a plurality of reload operations.

FIG. 1B schematically shows the computing device 10 when the processor 12 executes the executable code 40 in a runtime environment 68. For example, the executable code 40 may be executed at the IDE, at a command line, or in a web browser. When the processor 12 receives instructions to execute the executable code 40, the processor 12 may be configured to execute a launcher 64. The launcher 64 may include a reload manager 66 at which code instructions associated with hot reloading may be executed.

As depicted in FIG. 1B, the processor 12 may be further configured to assign two or more reload indicators 70 to two or more executable code modules 42 of the plurality of executable code modules 42. For example, the processor 12 may be configured to assign the reload indicators 70 to the two or more executable code modules 42 in response to receiving instructions to execute the executable code 40. For example, the reload indicators 70 may be attributes assigned to the executable code 40 indicating that the two or more executable code modules 42 are configured to be notified of a hot reload. Each reload indicator 70 may specify a reload operation 62 configured to be performed on its respective executable code module 42 during a hot reload. As discussed in further detail below, the reload indicators 70 may be assigned to the two or more executable code modules 42 based at least in part on what functions are included in the one or more executable code modules 42.

In some examples, as shown in FIG. 1B, the processor 12 may be configured to assign the reload indicators 70 to the two or more executable code modules 42 at a launcher 64 that is executed at the processor 12 when instructions to execute the executable code 40 are received. One or more of the reload indicators 70 may also be assigned by the user via user input performed at the IDE interface 22. When the executable code 40 is executed at the runtime environment, the processor 12 may be further configured to implement a reload agent 67 configured to apply an executable code update 44 to the executable code 40 invoke one or more handlers 72, as discussed in further detail below. The reload agent 67 may be injected into the executable code 40 by the reload manager 66 when the executable code 40 is launched.

In some examples, each reload operation 62 may be a cache clear or a user interface refresh operation. In such examples, performing a cache clear includes deleting cached data associated with an executable code module 42. Performing a user interface refresh operation includes reloading at least a portion of the GUI 20 specified at the executable code module 42. Other types of reload operations 62 may additionally or alternatively be performed. For example, as another type of reload operation 62, data may be reloaded from a database. In some examples, at least one of the two or more executable code modules 42 may have a plurality of associated reload indicators 70 that specify different reload operations 62. For example, an executable code module 42 may have a reload indicator that indicates a cache clear operation and a reload indicator that indicates a user interface refresh operation. Thus, in such examples, there may be an N-to-M mapping between the two or more executable code modules 42 and the two or more reload indicators 70.

In some examples, the processor 12 may be configured to assign the two or more reload indicators 70 to the two or more executable code modules 42 at least in part by assigning a plurality of handlers 72 to the two or more executable code modules 42. The handlers 72 may indicate the respective reload operation types of the two or more reload operations 70. Each handler 72 may include code instructions to execute the indicated reload operation 62 when the handler 72 is invoked. As shown in the example of FIG. 1B, the processor 12 may be configured to invoke the plurality of handlers 72 at the reload manager 66 of the launcher 64 when the executable code 40 is launched. In examples in which a plurality of handlers 72 are assigned to the two or more executable code modules 42, the plurality of handlers 72 may be used as the reload indicators 70.

In other examples, the reload indicators 70 may be identifiers that do not include code instructions that are executable to perform a reload operation 62. For example, the reload indicators 70 may be ID numbers that are configured to be read by the reload agent 67. The reload agent 67 may, in such examples, be configured to identify each reload operation 62 based on the ID numbers of the two or more executable code modules 42, and may be further configured to perform the reload operations 62 indicated by those ID numbers.

Returning to FIG. 1A, during execution of the executable code 40, the processor 12 may be further configured to receive a source code update 34 to the source code 30. For example, the source code update 34 may add one or more additional source code modules 36 to the source code 30, remove one or more source code modules 32 from the source code 30, and/or modify one or more source code modules 32 included in the source code 30. At the compiler 38, during execution of the executable code 40, the processor 12 may be further configured to generate an executable code update 44 from the source code 30 and the source code update 34. The processor 12 may be further configured to apply the executable code update 44 to the executable code 40 to generate updated executable code 50. The updated executable code 50 may include one or more of the executable code modules 42 that were included in the executable code 40 prior to performing the executable code update 44. In addition, the one or more executable code modules 42 of the updated executable code 50 may include one or more updated executable code modules 52 that have been modified by the executable code update 44. In examples in which the source code update 34 adds one or more additional source code modules 36, the processor 12 may be further configured to generate one or more additional executable code modules 56 from the one or more additional source code modules 36. The one or more additional executable code modules 56 may be included among the plurality of executable code modules 42 of the updated executable code 50.

In some examples in which the source code update 34 adds an additional source code module 36 to the source code 30, the processor 12 may be further configured to assign an additional reload indicator 71 to the additional executable code module 56, as shown in the example of FIG. 1B. The additional reload indicator 71 may be assigned programmatically based on one or more functions included in the additional executable code module 56. Alternatively, the user may manually assign the additional reload indicator 71 to the additional executable code module 56. Assigning the additional reload indicator 71 to the additional executable code module 56 may include assigning an additional handler 73 to the additional executable code module 56.

During execution of the executable code 40, the processor 12 may be further configured to generate a reload ordering 60 of the two or more reload operations 62 corresponding to the reload indicators 70. The reload ordering 60 may indicate the order in which the processor 12 is configured to perform the reload operations 62 specified by the reload indicators 70 during a hot reload. As specified by the reload ordering 60, the processor 12 may be further configured to perform the two or more reload operations 62 at the two or more respective executable code modules 42 to which the reload indicators 70 are assigned. Subsequently to performing the two or more reload operations 62, the processor 12 may be further configured to execute the updated executable code 50.

Although, in the examples discussed above, the reload ordering 60 is generated and the two or more reload operations 62 are performed subsequently to applying the executable code update 44, the processor 12 may, in other examples, be configured to perform the two or more reload operations 62 prior to applying the executable code update 44 to the executable code 40. Additionally or alternatively, in some examples, one or more of the reload operations 62 may be performed subsequently to beginning execution of the updated executable code 50.

Figure 2:
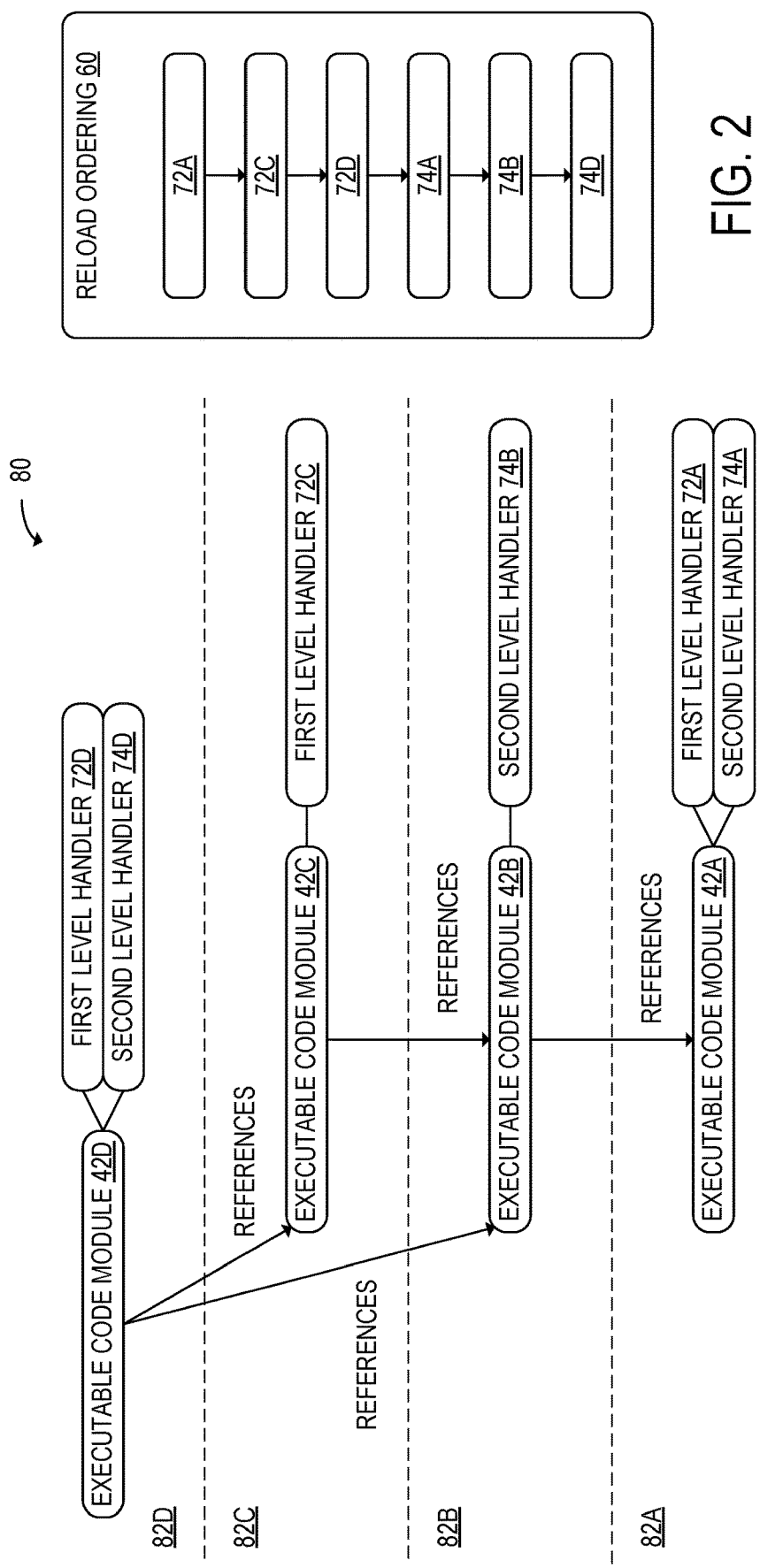
FIG. 2 shows an example graph topology including a plurality of executable code modules, according to the example of FIG. 1A.

In some examples, the plurality of reload operations 62 may be sorted into the reload ordering 60 based at least in part on a graph topology of the updated executable code 50. FIG. 2 shows an example graph topology 80 including the plurality of executable code modules 42 included in the updated executable code 50. As depicted in FIG. 2, the plurality of executable code modules 42 may be organized into a plurality of dependency hierarchy levels. In the example of FIG. 2, the updated executable code 50 includes executable code modules 42A, 42B, 42C, and 42D that are respectively included in a first dependency hierarchy level 82A, a second dependency hierarchy level 82B, a third dependency hierarchy level 82C, and a fourth dependency hierarchy level 82D, in ascending order. In this example, the executable code module 42B references the executable code module 42A, the executable code module 42C references the executable code module 42B, and the executable code module 42D references the executable code modules 42B and 42C. The plurality of dependency hierarchy levels 82A, 82B, 82C, and 82D are defined such that for each dependency hierarchy level other than the lowest level, each executable code module 42 included in that dependency hierarchy level references at least one other executable code module 42 in the next level down without referencing any other executable code modules 42 in its own level or above. The lowest dependency hierarchy level (the first dependency hierarchy level 82A in the example of FIG. 2) includes one or more executable code modules 42 that do not include any references to other executable code modules 42. Accordingly, the graph topology 80 is structured as a directed acyclic graph.

In the example of FIG. 2, the executable code module 42A has a first level handler 72A and a second level handler 74A, the executable code module 42B has a second level handler 74B, the executable code module 42C has a first level handler 72C, and the executable code module 42D has a first level handler 72D and a second level handler 74D. The first level handlers 72A, 72C, and 72D may correspond to respective reload operations 62 having a first reload operation type. The second level handlers 74A, 74B, and 74D may correspond to respective reload operations 62 having a second reload operation type. For example, the first level handlers 72A, 72C, and 72D may include instructions to perform cache clears and the second level handlers 74A, 74B, and 74D may include instructions to perform user interface refresh operations.

As shown in the example of FIG. 2, the processor 12 may be configured to generate the reload ordering 60 at least in part by sorting the plurality of handlers 72 by reload operation type. For example, the plurality of handlers 72 may be sorted into a subset of handlers 72 indicating cache clear operations and a plurality of handlers indicating user interface refresh operations. In the example of FIG. 2, the plurality of handlers 72 are sorted such that the first level handlers 72A, 72C, and 72D are configured to be invoked before the plurality of second level handlers 74A, 74B, and 74D.

In examples in which the executable code modules 42 are organized into a plurality of dependency hierarchy levels, as in the example of FIG. 2, the processor 12 may be configured to generate the reload ordering 60 at least in part by sorting the plurality of handlers 72 associated with the two or more executable code modules 42 by dependency hierarchy level. The plurality of handlers 72 may be sorted by dependency hierarchy level for each reload operation type such that in the example of FIG. 2, the first level handlers 72A, 72C, and 72D are configured to be invoked in ascending order. Subsequently to invoking the first level handlers 72A, 72C, and 72D, the processor 12 may be further configured to invoke the second level handlers 74A, 74B, and 74D in ascending order.

Returning to FIGS. 1A-1B, the source code update 34 may, in some examples, remove a source code module 32 from the source code 30. In such examples, when the reload ordering 60 is generated, the processor 12 may be further configured to exclude a corresponding reload operation 62 of the two or more reload operations 62 from the reload ordering 60. The reload operation 62 excluded from the reload ordering 60 may be associated with an executable code module 42 generated from the source code module 32, as indicated by a reload indicator 70 of that executable code module 42. In examples in which two or more executable code modules 42 are generated from the source code module 32, the respective reload operations 62 associated with one or more of those executable code modules 42 may be removed from the reload ordering 60. Thus, the processor 12 may be configured to skip one or more reload operations 62 that have been rendered irrelevant by the source code update 34.

Figure 3A:
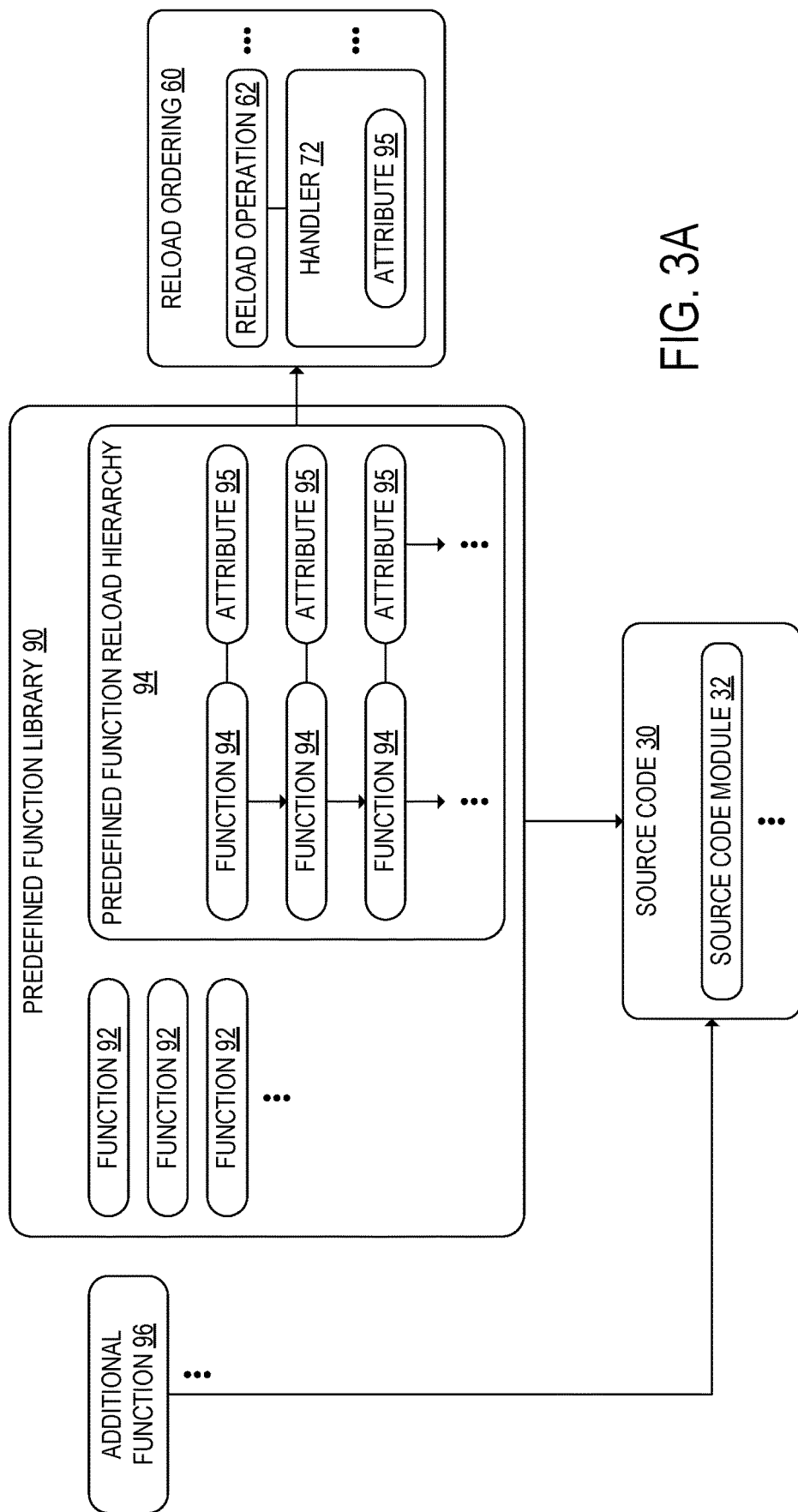
FIG. 3A schematically shows a predefined function library including a plurality of functions having a predefined function reload hierarchy, according to the example of FIG. 1A.

FIG. 3A schematically depicts a predefined function library 90 including a plurality of functions 92 that may be included in the source code 30 in the plurality of source code modules 32. For example, the predefined function library 90 may be a library of frequently used mathematical operations. As another example, the predefined function library 90 may include functions frequently used in applications that communicate with other computing devices over a network. In some examples, functions 92 from two or more different predefined function libraries 90 may be included in the source code modules 32. The source code modules 32 may additionally or alternatively include one or more additional functions 96 not included in a predefined function library 90. By using the functions 92 included in the predefined function library 90, the developer may avoid having to rewrite code for frequently-performed computational tasks when writing the source code 30.

In some examples, the predefined function library 90 may have a predefined function reload hierarchy 94. The predefined function reload hierarchy 94 may specify two or more of the functions 92 included in the predefined function library 90 for which executable code modules 42 generated from source code modules 32 including those functions 92 are configured to be assigned respective reload indicators 70. Thus, the predefined function reload hierarchy 94 may indicate one or more functions 92 that are configured to have corresponding reload operations 62. The predefined function reload hierarchy 94 may further specify one or more respective handlers 72 for the reload operations 62 associated with such functions 92. The predefined function reload hierarchy 94 may further indicate an order in which the reload operations 62 associated with such reload indicators 70 are configured to be performed. The processor 12 may be configured to generate the reload ordering 60 based at least in part on the predefined function reload hierarchy 94 for the plurality of functions 92 included in the predefined function library 90.

In some examples, when the processor 12 assigns the reload indicators 70 to the two or more executable code modules 42, the processor 12 may be configured to identify the executable code modules 42 to which to assign the reload indicators 70 at least in part by identifying one or more source code modules 32 that include respective functions 92 included in the predefined function reload hierarchy 94. When a source code module 32 includes one or more functions 92 included in the predefined function reload hierarchy, the processor 12 may be further configured to assign one or more respective handlers 72 for the one or more corresponding reload operations 62 associated with each of the one or more functions 92 to the executable code module 42 generated from that source code module 32. Thus, the processor 12 may be configured to refer to the predefined function reload hierarchy 94 when identifying the executable code modules 42 for which reload operations 62 are configured to be performed.

In some examples, one or more of the handlers 72 may have one or more respective attributes indicating one or more dependencies of those handlers 72 on one or more other handlers 72. For example, the attribute included in a handler may indicate that the handler 72 is configured to be invoked before or after the one or more other handlers 72. The one or more attributes of the one or more handlers 72 may be specified in the predefined function reload hierarchy 94. The processor 12 may be configured to generate the reload ordering 60 such that each dependency indicated by one or more handler attributes is satisfied.

For one or more additional functions 96 included in the source code 30 that are not included in the predefined function library 90, the processor 12 may be configured to determine the locations of such additional functions 96 in the reload ordering 60 programmatically. For example, the locations of the one or more additional functions 96 may be computed as discussed above with reference to FIG. 2. Additionally or alternatively, at the IDE interface 22, the developer may specify one or more respective locations in the predefined function reload hierarchy 94 for respective reload operations 62 associated with one or more additional functions 96. Accordingly, the developer may explicitly set at least a portion of the reload ordering 60.

Figure 3B:
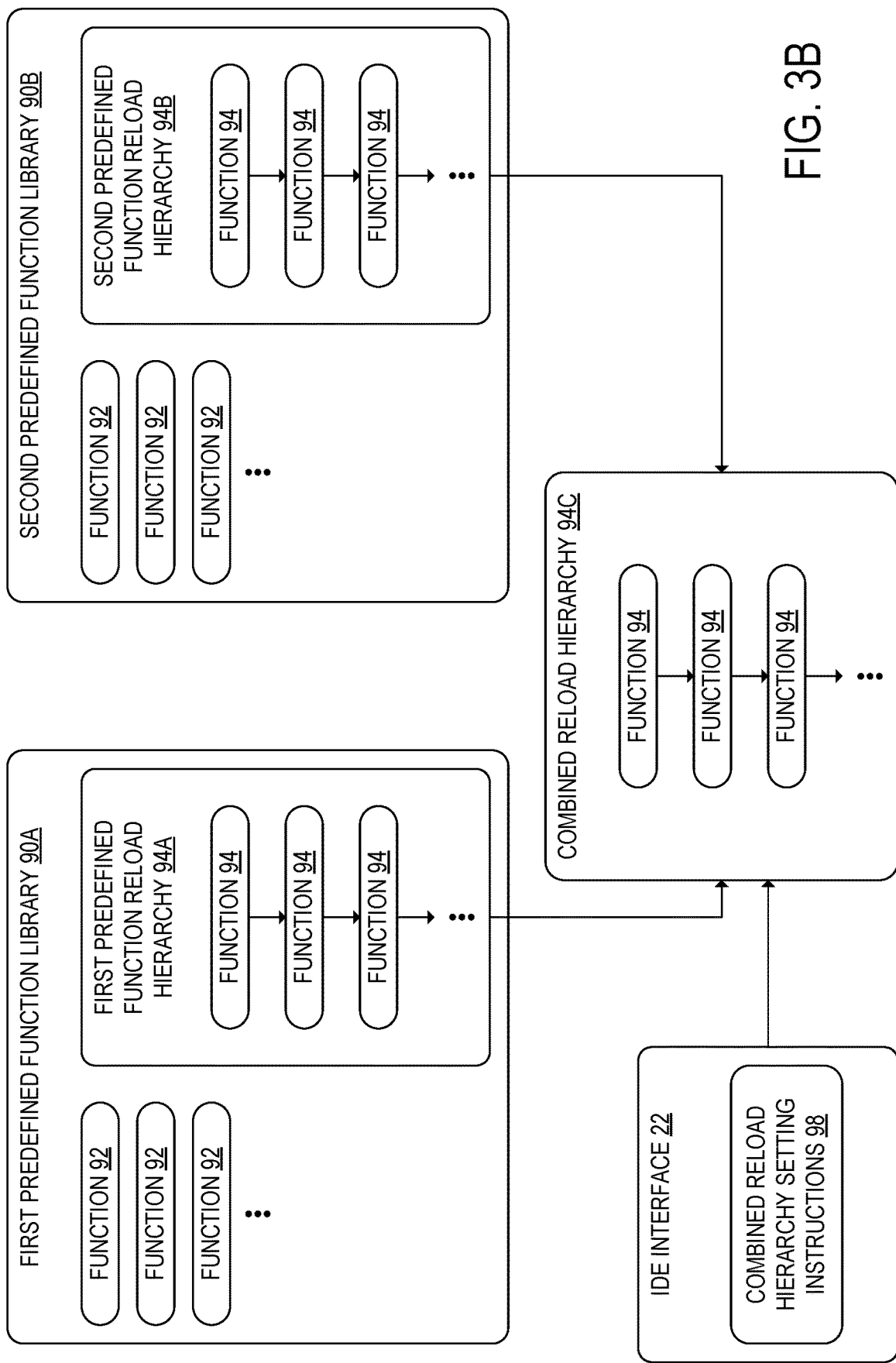
FIG. 3B schematically shows a combined reload hierarchy generated from a first predefined function reload hierarchy of a first predefined function library and a second predefined function reload hierarchy of a second predefined function library, according to the example of FIG. 1A.

FIG. 3B schematically depicts an example of a first predefined function library 90A with a first predefined function reload hierarchy 94A and a second predefined function library 90B with a second predefined function reload hierarchy 94B. When the source code 30 uses functions 92 included in a plurality of different predefined function libraries 90, such as the first predefined function library 90A and the second predefined function library 90B of FIG. 3B, the developer may specify a combined reload hierarchy 94C based on the respective predefined function reload hierarchies 94A and 94B of the predefined function libraries 90A and 90B. The developer may define the combined reload hierarchy 94C by entering combined reload hierarchy setting instructions 98 at the IDE interface 22. In some examples, the combined reload hierarchy 94C may be defined for the plurality of functions 92 included in the source code 30 rather than for all functions 92 included in the first predefined function library 90A and the second predefined function library 90B. In examples in which the processor 12 generates a combined reload hierarchy 94C, the processor 12 may be configured to compute the reload ordering 60 based at least in part on the combined reload hierarchy 94C.

Figure 4:
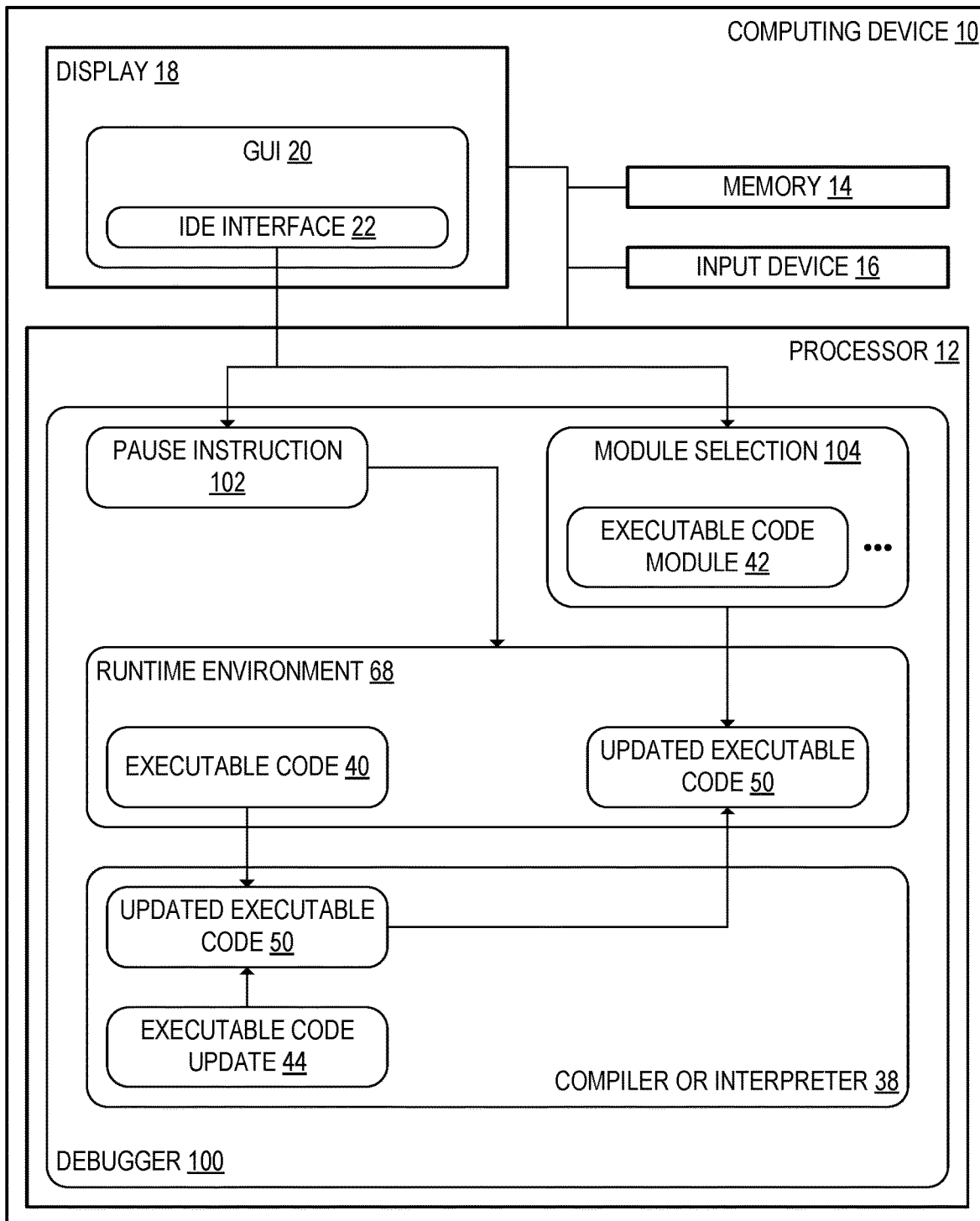
FIG. 4 schematically shows the computing device when the processor is configured to execute a debugger, according to the example of FIG. 1A.

FIG. 4 schematically depicts the computing device 10 in an example in which the processor 12 is configured to execute the executable code 40 at a debugger 100. At the debugger 100, the processor 12 may be further configured to pause execution of one or more threads of the executable code 40 in response to receiving a pause instruction 102. The pause instruction 102 may be input by the developer at the IDE interface 22 and may indicate one or more executable code modules 42. For example, the developer may instruct the debugger 100 to pause execution of threads associated with one or more executable code modules 42 that exhibit unintended behavior. The processor 12 may be further configured to continue to execute one or more other threads of the executable code 40 while the one or more threads are paused.

Subsequently to pausing the execution of the one or more threads, the processor 12 may be further configured to apply the executable code update 44 to the executable code 40. The executable code update 44 may be applied to the executable code 40 at the compiler 38, as discussed above with reference to FIG. 1A. The processor 12 may be further configured to perform the two or more reload operations 62, while code execution is paused at the debugger 100, subsequently to applying the executable code update 44 to the executable code.

In some examples, the processor 12 may be further configured to receive a module selection 104 at the debugger 100 while the execution of the executable code 40 is paused. The module selection 104 may select one or more executable code modules 42 of the updated executable code 40 for execution. The processor 12 may be further configured to perform the two or more reload operations 62 in response to receiving the module selection 104 of the one or more executable code modules 42. The two or more reload operations 62 that are performed in such examples may be associated with the one or more executable code modules 42 indicated in the module selection 104. Thus, the developer may select one or more specific executable code modules 42 of the executable code 40 to test at the debugger 100, and the two or more reload operations 62 indicated by handlers 72 associated with the one or more selected executable code modules 42 may be performed. The processor 12 may be further configured to execute the one or more selected executable code modules 42 of the updated executable code 50 subsequently to performing the two or more reload operations 62.

Figure 5A:
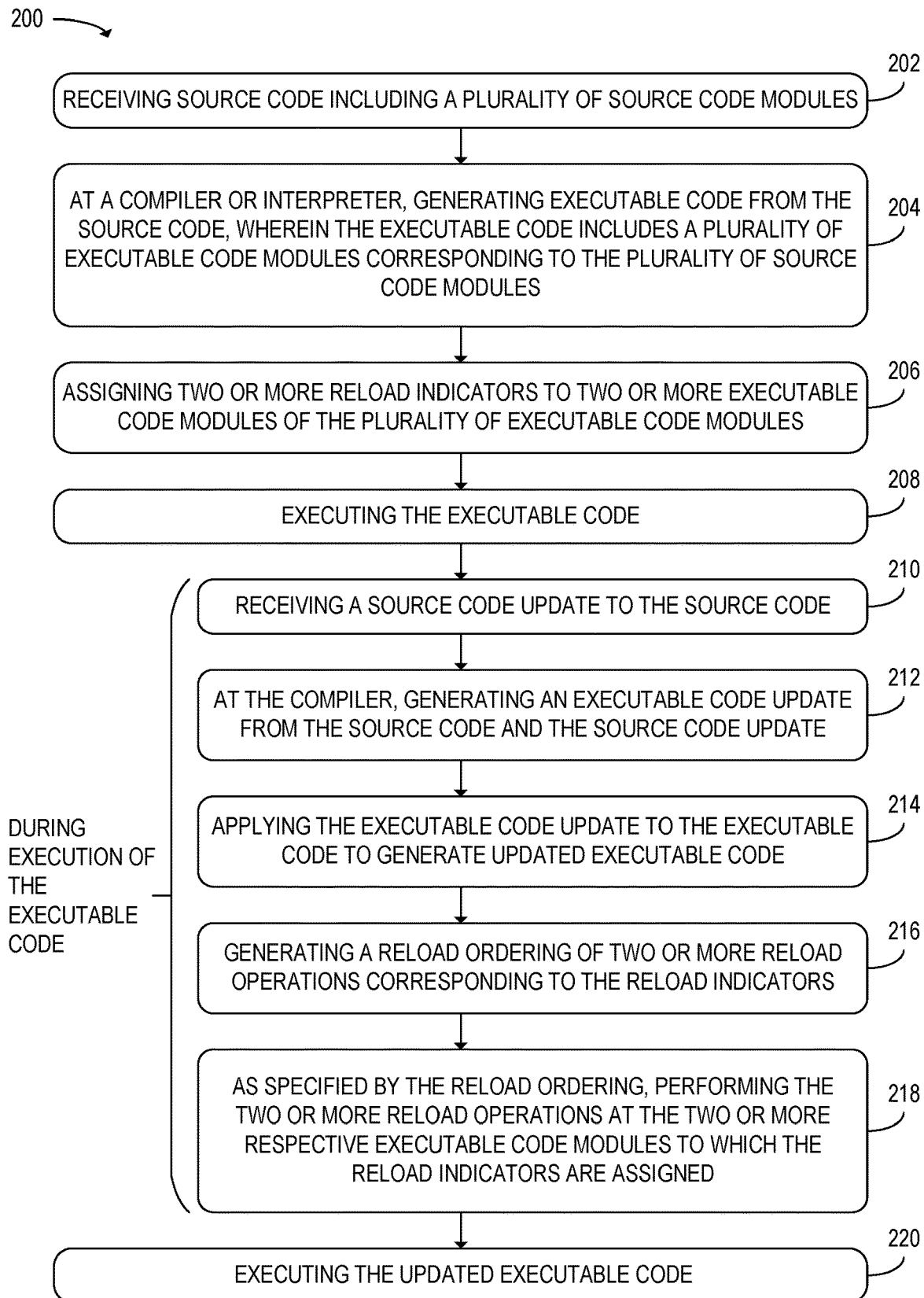
FIG. 5A shows a flowchart of an example method for use with a computing device when a hot reload is performed, according to the example of FIG. 1A.

FIG. 5A shows a flowchart of a method 200 for use with a computing device. The method 200 may be used with the computing device 10 of FIGS. 1A-1B or with some other computing device. At step 202, the method 200 may include receiving source code including a plurality of source code modules. Each source code module may include one or more code instructions. The source code may be received via an IDE at which a developer may write the source code via interaction with an IDE interface included in a GUI. In some examples, the source code may utilize one or more functions included in one or more predefined function libraries.

At step 204, the method 200 may further include, at a compiler, generating executable code from the source code. The executable code may include a plurality of executable code modules corresponding to the plurality of source code modules. In some examples, rather than having a one-to-one mapping between the plurality of source code modules and the plurality of executable code modules, the compiler may generate a corresponding plurality of executable code modules from at least one source code module of the plurality of source code modules. Additionally or alternatively, the compiler may generate at least one executable code module that combines instructions from two or more source code modules.

At step 206, the method 200 may further include assigning two or more reload indicators to two or more executable code modules of the plurality of executable code modules. Each reload indicator may indicate that a reload operation is configured to be performed at the executable code module to which the reload indicator is assigned. In some examples, a plurality of reload indicators may be assigned to an executable code module. The reload indicators may be assigned to the executable code modules programmatically without user intervention. For example, when an executable code module is generated from a source code module that includes a function included in a predetermined function library, the predetermined function library may indicate one or more reload operations associated with that function. One or more reload indicators that indicate the one or more reload operations may, in such examples, be assigned to the executable code module generated from the source code module that includes the function.

Figure 5B:
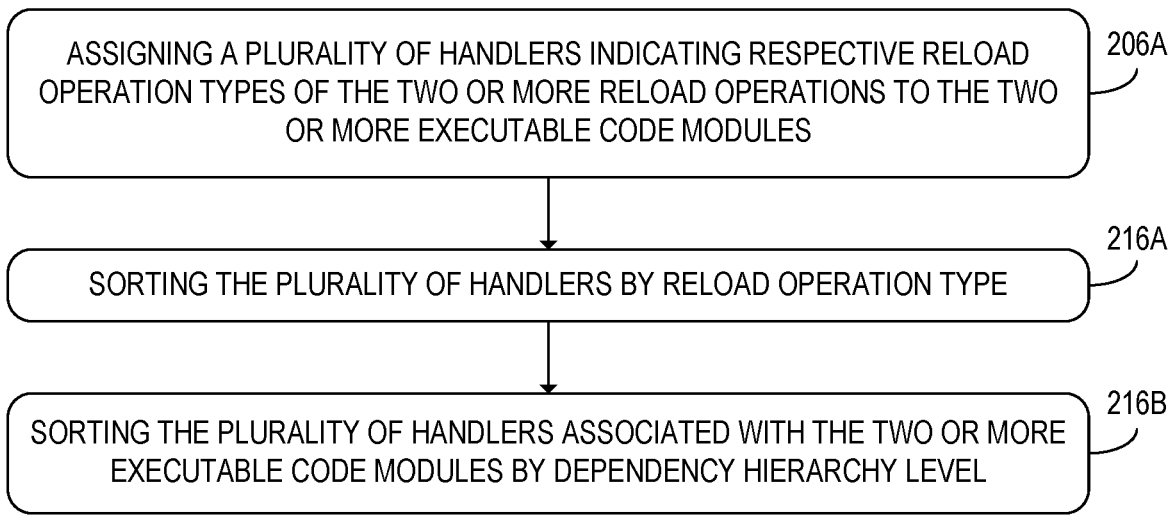
FIG. 5B shows additional steps of the method of FIG. 5A that may be performed in some examples when a plurality of handlers are assigned to two or more executable code modules.

As depicted in FIG. 5B, step 206 may include, at step 206A, assigning a plurality of handlers indicating respective reload operation types of the two or more reload operations to the two or more executable code modules. Each handler of the plurality of handlers may include code instructions that are configured to apply a respective reload operation to at least one executable code module when executed. For example, each reload operation of the two or more reload operations may be a cache clear or a user interface refresh operation.

Returning to FIG. 5A, at step 208, the method 200 may further include executing the executable code. The executable code may be executed within the IDE or within some other environment. For example, the executable code may be executed from a command line or within a web browser.

At step 210, during execution of the executable code, the method 200 may further include receiving a source code update to the source code. The source code update may be received via the IDE interface. The source code update may add one or more additional source code modules, remove one or more source code modules, and/or modify one or more source code modules. At step 212, the method 200 may further include, at the compiler, generating an executable code update from the source code and the source code update. The method 200 may further include, at step 214, applying the executable code update to the executable code to generate updated executable code.

Figure 5C:
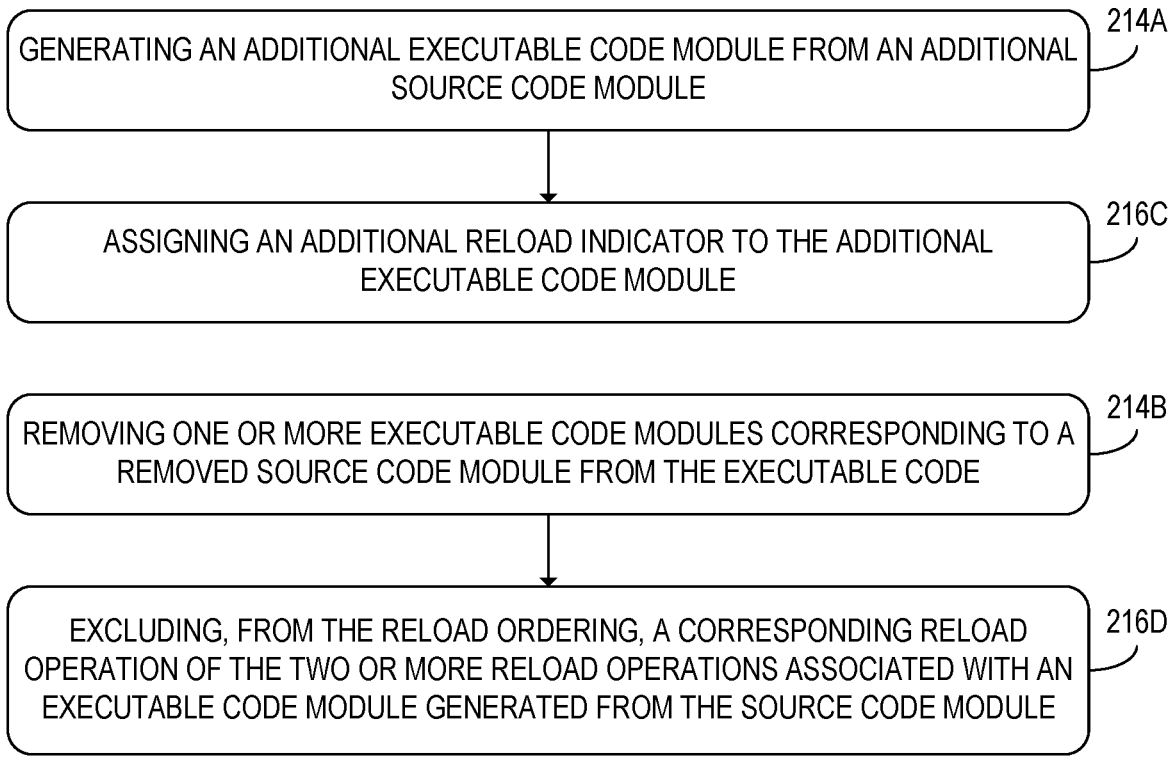
FIG. 5C shows additional steps of the method of FIG. 5A that may be performed in some examples when one or more executable code modules are added to and/or removed from executable code.

As shown in FIG. 5C, in examples in which the source code update adds an additional source code module to the source code, the method 200 may further include, at step 214A, generating an additional executable code module from the additional source code module. In examples in which the source code update removes a source code module from the source code, the method 200 may further include, at step 214B, removing one or more executable code modules corresponding to the removed source code module from the executable code when the updated executable code is generated.

Returning to FIG. 5A, the method 200 may further include, at step 216, generating a reload ordering of two or more reload operations corresponding to the reload indicators. The reload ordering may specify the order in which the two or more reload operations are configured to be performed. In some examples, as shown in FIG. 5B, step 216 may include, at step 216A, sorting the plurality of handlers by reload operation type. For example, when each reload operation is a cache clear or a user interface refresh operation, the handlers may be sorted such that each handler indicating a cache clear is located earlier in the reload ordering than each handler indicating a user interface refresh operation.

At step 216B, in examples in which the plurality of executable code modules are organized into a plurality of dependency hierarchy levels, step 216 may include sorting the plurality of handlers associated with the two or more executable code modules by dependency hierarchy level. In such examples, the reload ordering may be generated such that the reload operations for executable code modules lower in the dependency hierarchy are performed prior to the reload operations for executable code modules higher in the dependency hierarchy. In some examples, the reload ordering may be generated such that handlers are sorted by reload operation type and are further sorted by dependency hierarchy level within each reload operation type.

As another example, a handler of the plurality of handlers may have an attribute that explicitly indicates one or more dependencies of the handler. For example, the attribute may indicate one or more respective handler identifiers of one or more handlers that are configured to be executed prior to the handler. The attribute may additionally or alternatively indicate one or more respective handler identifiers of one or more other handlers that are configured to be executed after the handler. Such attributes may, for example, be loaded from a predefined function reload hierarchy for a plurality of functions included in a predefined function library. The reload ordering may be generated based at least in part on one or more such dependencies indicated by the one or more handler attributes.

In examples in which step 214A is performed, as depicted in FIG. 5C, step 216 may further include, at step 216C, assigning an additional reload indicator to the additional executable code module. The reload ordering may be generated such that the additional reload operation indicated by the additional reload indicator is included. At step 216D, in examples in which step 214B is performed, step 216 may further include excluding, from the reload ordering, a corresponding reload operation of the two or more reload operations associated with an executable code module generated from the source code module that is removed from the source code. When a source code module is modified, one or more reload operations may also be added to or removed from the reload ordering. The respective reload operation types of one or more reload operations included in the reload ordering may additionally or alternatively be changed.

In examples in which the source code includes one or more functions included in a predefined function library, the predefined function library may include a predefined function reload hierarchy that indicates a predefined reload ordering for the functions included in the predefined function library. In such examples, the reload ordering may be generated at least in part as indicated in the predefined function reload hierarchy. When the source code includes functions from a plurality of predefined function libraries, a combined reload hierarchy may be generated from the respective predefined function reload hierarchies of the predefined function libraries. The reload ordering may be generated at least in part as indicated in the combined reload hierarchy.

Returning to FIG. 5A, at step 218, the method 200 may further include performing the two or more reload operations, as specified by the reload ordering, at the two or more respective executable code modules to which the reload indicators are assigned. The two or more reload operations may be performed during execution of the executable code. Accordingly, hot reloading may be performed for the two or more executable code modules in the order specified by the reload ordering.

At step 220, the method 200 may further include executing the updated executable code. For example, the updated executable code may be executed subsequently to performing the two or more reload operations. In some examples, one or more of the reload operations may be executed subsequently to initiating execution of the updated executable code. When the updated executable code is executed, context that has not been reloaded by the one or more reload operations may be preserved. Thus, the developer may update and test the source code without having to recreate the context in which the executable code is executed whenever the source code is updated.

Figure 5D:
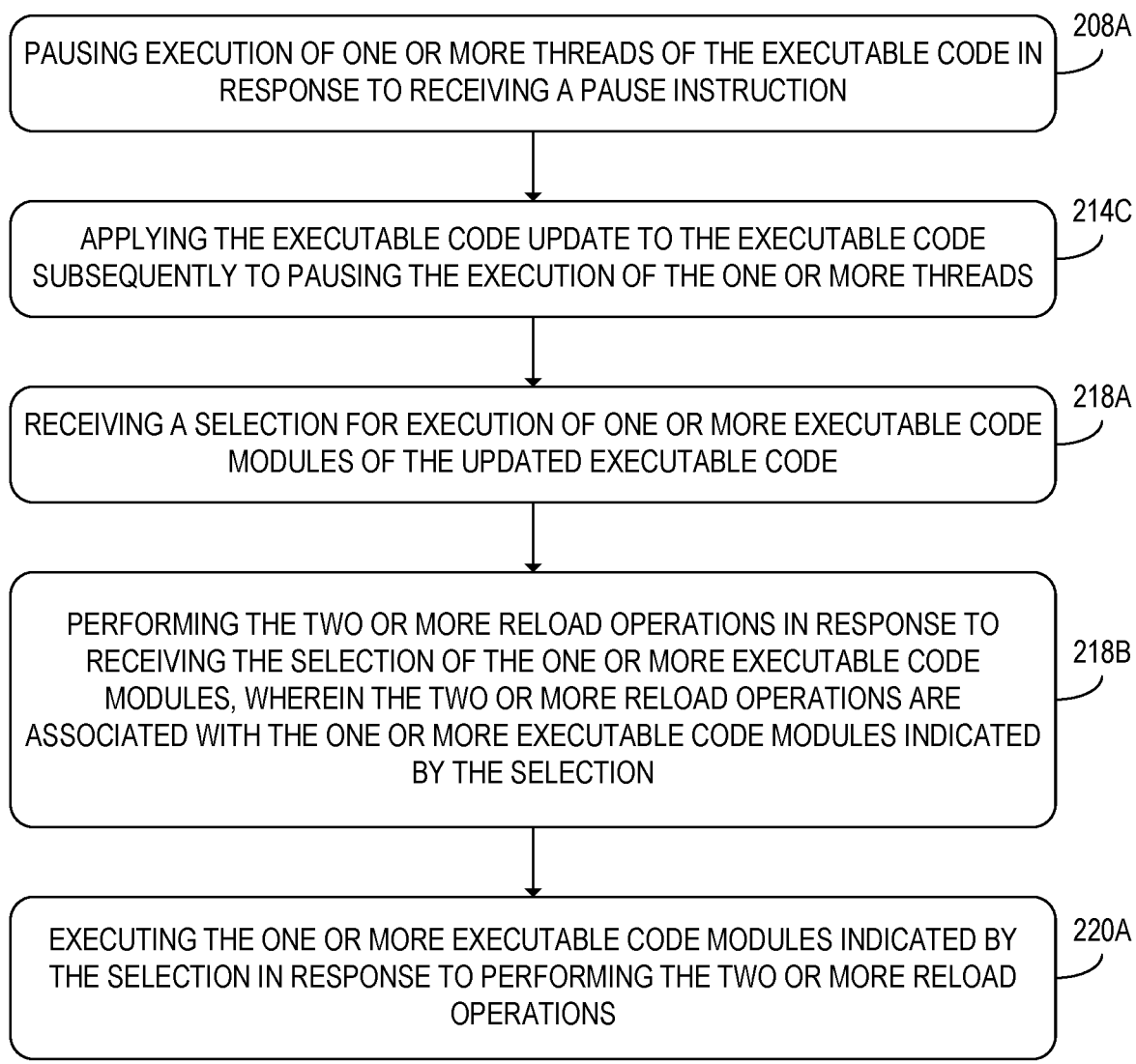
FIG. 5D shows additional steps of the method of FIG. 5A that may be performed in some examples when the executable code is executed at a debugger.

FIG. 5D shows additional steps of the method 200 that may be performed in examples in which the executable code is executed at a debugger. At step 208A, during execution of the executable code, the method 200 may further include pausing execution of one or more threads of the executable code in response to receiving a pause instruction. The pause instruction may be input by the developer at the IDE interface. While the one or more threads are paused, execution of one or more other threads may continue. At step 214C, step 214 may include applying the executable code update to the executable code subsequently to pausing the execution of the one or more threads.

At step 218A, the method 200 may further include receiving a selection for execution of one or more executable code modules of the updated executable code. The one or more executable code modules may be selected at the IDE interface. The one or more executable code modules that are selected for execution may include one or more of the executable code modules for which one or more respective threads are paused. At step 218B, the method 200 may further include performing the two or more reload operations in response to receiving the selection of the one or more executable code modules. The two or more reload operations may be associated with the one or more executable code modules indicated by the selection. At step 220A, step 220 may include executing the one or more executable code modules indicated by the selection in response to performing the two or more reload operations. Thus, the developer may instruct the debugger to pause, reload, and resume execution of one or more processor threads associated with one or more specific executable code modules. For example, the developer may input pause instructions and a module selection for one or more executable code modules that exhibit unintended behavior.

Using the devices and methods discussed above, a developer may perform hot reloading during the process of writing and testing source code. When hot reloading is performed using the systems and methods discussed above, programmatically generating the reload ordering may allow the developer to avoid having to manually specify the modules for which reload operations are performed or the order in which to perform those reload operations. In addition, the methods of generating the reload ordering discussed above may allow for more consistent and reliable behavior of the executable code due to the reload operations having a consistent order. Accordingly, the devices and methods discussed above may allow the developer to test and debug the source code more easily.

In one example use case scenario, a first source code module exposes information about available methods included in the source code and a second source code module performs a computation using the list of available methods as inputs. A patch adding a new method is applied to the source code. Before the second source code module computes its output, the cache of the first source code module is cleared. Generating a reload ordering and reloading the source code modules according to the reload ordering allows the second source code module to return an up-to-date output, whereas the second source code module would return a stale output if it were to recompute its output before the first source code component.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
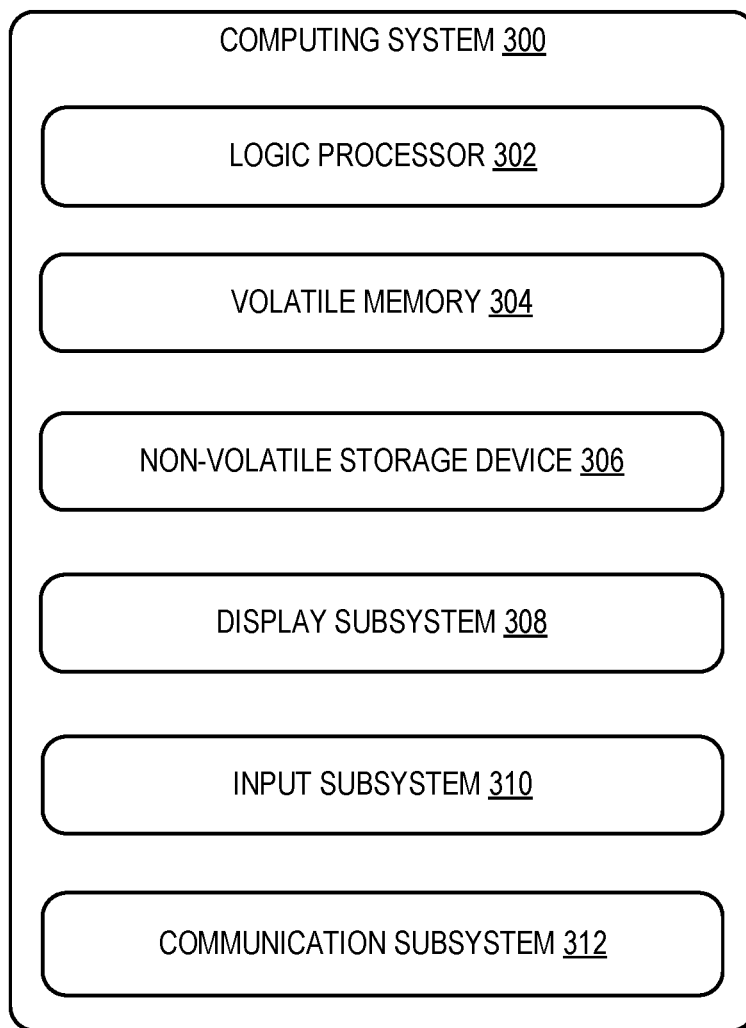
FIG. 6 schematically shows an example computing system in which the computing device of FIG. 1A may be instantiated.

FIG. 6 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Components of the computing system 300 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 1.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a processor configured to receive source code including a plurality of source code modules. At a compiler or interpreter, the processor may be further configured to generate executable code from the source code. The executable code may include a plurality of executable code modules corresponding to the plurality of source code modules. The processor may be further configured to assign two or more reload indicators to two or more executable code modules of the plurality of executable code modules. The processor may be further configured to execute the executable code. During execution of the executable code, the processor may be further configured to receive a source code update to the source code. At the compiler or interpreter, the processor may be further configured to generate an executable code update from the source code and the source code update. The processor may be further configured to apply the executable code update to the executable code to generate updated executable code. The processor may be further configured to generate a reload ordering of two or more reload operations corresponding to the reload indicators. As specified by the reload ordering, the processor may be further configured to perform the two or more reload operations at the two or more respective executable code modules to which the reload indicators are assigned. The processor may be further configured to execute the updated executable code.

According to this aspect, the processor may be configured to assign the two or more reload indicators to the two or more executable code modules at least in part by assigning a plurality of handlers indicating respective reload operation types of the two or more reload operations to the two or more executable code modules.

According to this aspect, each reload operation of the two or more reload operations may be a cache clear or a user interface refresh operation.

According to this aspect, the processor may be configured to generate the reload ordering at least in part by sorting the plurality of handlers by reload operation type.

According to this aspect, the plurality of executable code modules may be organized into a plurality of dependency hierarchy levels. The processor may be configured to generate the reload ordering at least in part by sorting the plurality of handlers associated with the two or more executable code modules by dependency hierarchy level.

According to this aspect, the processor may be configured to generate the reload ordering based at least in part on a predefined function reload hierarchy for a plurality of functions included in a predefined function library.

According to this aspect, the source code update may add an additional source code module to the source code. The processor may be further configured to generate an additional executable code module from the additional source code module. The processor may be further configured to assign an additional reload indicator to the additional executable code module.

According to this aspect, the source code update may remove a source code module from the source code. When the reload ordering is generated, the processor may be further configured to exclude, from the reload ordering, a corresponding reload operation of the two or more reload operations associated with an executable code module generated from the source code module.

According to this aspect, the processor may be configured to perform the two or more reload operations prior to applying the executable code update to the executable code.

According to this aspect, the processor may be configured to execute the executable code at a debugger. At the debugger, the processor may be further configured to pause execution of one or more threads of the executable code in response to receiving a pause instruction. The processor may be further configured to apply the executable code update to the executable code subsequently to pausing the execution of the one or more threads. The processor may be further configured to perform the two or more reload operations subsequently to applying the executable code update, while code execution is paused at the debugger.

According to this aspect, while the execution of the executable code is paused, the processor may be further configured to, at the debugger, receive a selection for execution of one or more executable code modules of the updated executable code. The processor may be further configured to perform the two or more reload operations in response to receiving the selection of the one or more executable code modules. The two or more reload operations may be associated with the one or more executable code modules indicated by the selection. The processor may be further configured to execute the one or more executable code modules indicated by the selection in response to performing the two or more reload operations.

According to another aspect of the present disclosure, a method for use with a computing device is provided. The method may include receiving source code including a plurality of source code modules. At a compiler or interpreter, the method may further include generating executable code from the source code. The executable code may include a plurality of executable code modules corresponding to the plurality of source code modules. The method may further include assigning two or more reload indicators to two or more executable code modules of the plurality of executable code modules. The method may further include executing the executable code. During execution of the executable code, the method may further include receiving a source code update to the source code. At the compiler or interpreter, the method may further include generating an executable code update from the source code and the source code update. The method may further include applying the executable code update to the executable code to generate updated executable code. The method may further include generating a reload ordering of two or more reload operations corresponding to the reload indicators. The method may further include, as specified by the reload ordering, performing the two or more reload operations at the two or more respective executable code modules to which the reload indicators are assigned. The method may further include executing the updated executable code.

According to this aspect, assigning the two or more reload indicators to the two or more executable code modules may include assigning a plurality of handlers indicating respective reload operation types of the two or more reload operations to the two or more executable code modules.

According to this aspect, each reload operation of the two or more reload operations may be a cache clear or a user interface refresh operation.

According to this aspect, generating the reload ordering may include sorting the plurality of handlers by reload operation type.

According to this aspect, the plurality of executable code modules may be organized into a plurality of dependency hierarchy levels. Generating the reload ordering may include sorting the plurality of handlers associated with the two or more executable code modules by dependency hierarchy level.

According to this aspect, the source code update may add an additional source code module to the source code. The method may further include generating an additional executable code module from the additional source code module. The method may further include assigning an additional reload indicator to the additional executable code module.

According to this aspect, the executable code may be executed at a debugger. The method may further include, at the debugger, pausing execution of one or more threads of the executable code in response to receiving a pause instruction. The method may further include applying the executable code update to the executable code subsequently to pausing the execution of the one or more threads. The method may further include receiving a selection for execution of one or more executable code modules of the updated executable code. The method may further include performing the two or more reload operations in response to receiving the selection of the one or more executable code modules. The two or more reload operations may be associated with the one or more executable code modules indicated by the selection. The method may further include executing the one or more executable code modules indicated by the selection in response to performing the two or more reload operations.

According to another aspect of the present disclosure, a computing device is provided, including a processor configured to receive source code including a plurality of source code modules. At a compiler or interpreter, the processor may be further configured to generate executable code from the source code. The executable code may include a plurality of executable code modules corresponding to the plurality of source code modules. The processor may be further configured to assign a plurality of handlers indicating respective reload operation types of two or more reload operations to two or more executable code modules of the plurality of executable code modules. The processor may be further configured to execute the executable code. During execution of the executable code, the processor may be further configured to receive a source code update to the source code. At the compiler or interpreter, the processor may be further configured to generate an executable code update from the source code and the source code update. The processor may be further configured to apply the executable code update to the executable code to generate updated executable code. The processor may be further configured to generate a reload ordering of the two or more reload operations corresponding to the reload indicators. Generating the reload ordering may include sorting the plurality of handlers by reload operation type. Generating the reload ordering may further include, for each reload operation type, sorting the plurality of handlers by dependency hierarchy level. As specified by the reload ordering, the processor may be further configured to perform the two or more reload operations at two or more respective executable code modules to which the reload indicators are assigned. Subsequently to performing the two or more reload operations, the processor may be further configured to execute the updated executable code.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive source code including a plurality of source code modules organized in a graph topology that includes a plurality of dependency hierarchy levels;
at a compiler or interpreter, generate executable code from the source code, wherein the executable code includes a plurality of executable code modules corresponding to the plurality of source code modules;
assign two or more reload indicators to two or more executable code modules of the plurality of executable code modules;
receive a source code update to the source code;
at the compiler or interpreter, generate an executable code update from the source code and the source code update;
generate a reload ordering of two or more reload operations corresponding to the reload indicators at least in part by sorting the two or more executable code modules by the dependency hierarchy levels of the source code modules from which the two or more executable code modules were generated, as indicated in the graph topology;
execute the executable code;
during execution of the executable code:
apply the executable code update to the executable code to generate updated executable code; and
as specified by the reload ordering, perform the two or more reload operations at the two or more respective executable code modules to which the reload indicators are assigned; and
execute the updated executable code.

2. The computing device of claim 1, wherein the processor is configured to assign the two or more reload indicators to the two or more executable code modules at least in part by assigning a plurality of handlers indicating respective reload operation types of the two or more reload operations to the two or more executable code modules.

3. The computing device of claim 2, wherein each reload operation of the two or more reload operations is a cache clear or a user interface refresh operation.

4. The computing device of claim 2, wherein the processor is configured to generate the reload ordering at least in part by sorting the plurality of handlers by reload operation type.

5. The computing device of claim 2, wherein the processor is configured to generate the reload ordering based at least in part on a first predefined function reload hierarchy for a first plurality of functions included in a first predefined function library.

6. The computing device of claim 5, wherein the processor is further configured to:
generate a combined reload hierarchy based at least in part on the first predefined function reload hierarchy for the first plurality of functions included in the first predefined function library and a second predefined function reload hierarchy for a second plurality of functions included in a second predefined function library; and generate the reload ordering based at least in part on the combined reload hierarchy.

7. The computing device of claim 1, wherein:
the source code update adds an additional source code module to the source code; and
the processor is further configured to:
generate an additional executable code module from the additional source code module; and
assign an additional reload indicator to the additional executable code module.

8. The computing device of claim 1, wherein:
the source code update removes a source code module from the source code; and
when the reload ordering is generated, the processor is further configured to exclude, from the reload ordering, a corresponding reload operation of the two or more reload operations associated with an executable code module generated from the source code module.

9. The computing device of claim 1, wherein the processor is configured to perform the two or more reload operations prior to applying the executable code update to the executable code.

10. The computing device of claim 1, wherein:
the processor is configured to execute the executable code at a debugger; and
at the debugger, the processor is further configured to:
pause execution of one or more threads of the executable code in response to receiving a pause instruction;
apply the executable code update to the executable code subsequently to pausing the execution of the one or more threads; and
perform the two or more reload operations subsequently to applying the executable code update, while code execution is paused at the debugger.

11. The computing device of claim 10, wherein, while the execution of the executable code is paused, the processor is further configured to:
at the debugger, receive a selection for execution of one or more executable code modules of the updated executable code;
perform the two or more reload operations in response to receiving the selection of the one or more executable code modules, wherein the two or more reload operations are associated with the one or more executable code modules indicated by the selection; and
execute the one or more executable code modules indicated by the selection in response to performing the two or more reload operations.

12. A method for use with a computing device, the method comprising:
receiving source code including a plurality of source code modules organized in a graph topology that includes a plurality of dependency hierarchy levels;
at a compiler or interpreter, generating executable code from the source code, wherein the executable code includes a plurality of executable code modules corresponding to the plurality of source code modules;
assigning two or more reload indicators to two or more executable code modules of the plurality of executable code modules;
receiving a source code update to the source code;
at the compiler or interpreter, generating an executable code update from the source code and the source code update;
generating a reload ordering of two or more reload operations corresponding to the reload indicators at least in part by sorting the two or more executable code modules by the dependency hierarchy levels of the source code modules from which the two or more executable code modules were generated, as indicated in the graph topology;
executing the executable code;
during execution of the executable code:
applying the executable code update to the executable code to generate updated executable code; and
as specified by the reload ordering, performing the two or more reload operations at the two or more respective executable code modules to which the reload indicators are assigned; and
executing the updated executable code.

13. The method of claim 12, wherein assigning the two or more reload indicators to the two or more executable code modules includes assigning a plurality of handlers indicating respective reload operation types of the two or more reload operations to the two or more executable code modules.

14. The method of claim 13, wherein each reload operation of the two or more reload operations is a cache clear or a user interface refresh operation.

15. The method of claim 13, wherein generating the reload ordering includes sorting the plurality of handlers by reload operation type.

16. The method of claim 13, further comprising generating the reload ordering based at least in part on a first predefined function reload hierarchy for a first plurality of functions included in a first predefined function library.

17. The method of claim 16, further comprising:
generating a combined reload hierarchy based at least in part on the first predefined function reload hierarchy for the first plurality of functions included in the first predefined function library and a second predefined function reload hierarchy for a second plurality of functions included in a second predefined function library; and
generating the reload ordering based at least in part on the combined reload hierarchy.

18. The method of claim 12, wherein:
the source code update adds an additional source code module to the source code; and
the method further includes:
generating an additional executable code module from the additional source code module; and
assigning an additional reload indicator to the additional executable code module.

19. The method of claim 12, wherein:
the executable code is executed at a debugger; and
the method further includes, at the debugger:
pausing execution of one or more threads of the executable code in response to receiving a pause instruction;
applying the executable code update to the executable code subsequently to pausing the execution of the one or more threads;
receiving a selection for execution of one or more executable code modules of the updated executable code;
performing the two or more reload operations in response to receiving the selection of the one or more executable code modules, wherein the two or more reload operations are associated with the one or more executable code modules indicated by the selection; and executing the one or more executable code modules indicated by the selection in response to performing the two or more reload operations.

20. A computing device comprising:
a processor configured to:
- receive source code including a plurality of source code modules organized in a graph topology that includes a plurality of dependency hierarchy levels;
- at a compiler or interpreter, generate executable code from the source code, wherein the executable code includes a plurality of executable code modules corresponding to the plurality of source code modules;
- assign a plurality of handlers indicating respective reload operation types of two or more reload operations to two or more executable code modules of the plurality of executable code modules;
- receive a source code update to the source code;
- at the compiler or interpreter, generate an executable code update from the source code and the source code update;
- generate a reload ordering of the two or more reload operations corresponding to the reload indicators, wherein generating the reload ordering includes:
  - sorting the plurality of handlers by reload operation type; and
  - for each reload operation type, sorting the plurality of handlers by dependency hierarchy level as indicated in the graph topology;
- execute the executable code;
- during execution of the executable code:
  - apply the executable code update to the executable code to generate updated executable code; and
  - as specified by the reload ordering, perform the two or more reload operations at two or more respective executable code modules to which the reload indicators are assigned; and
- subsequently to performing the two or more reload operations, execute the updated executable code.

\* \* \* \* \*